UNITED STATES PATENT OFFICE.

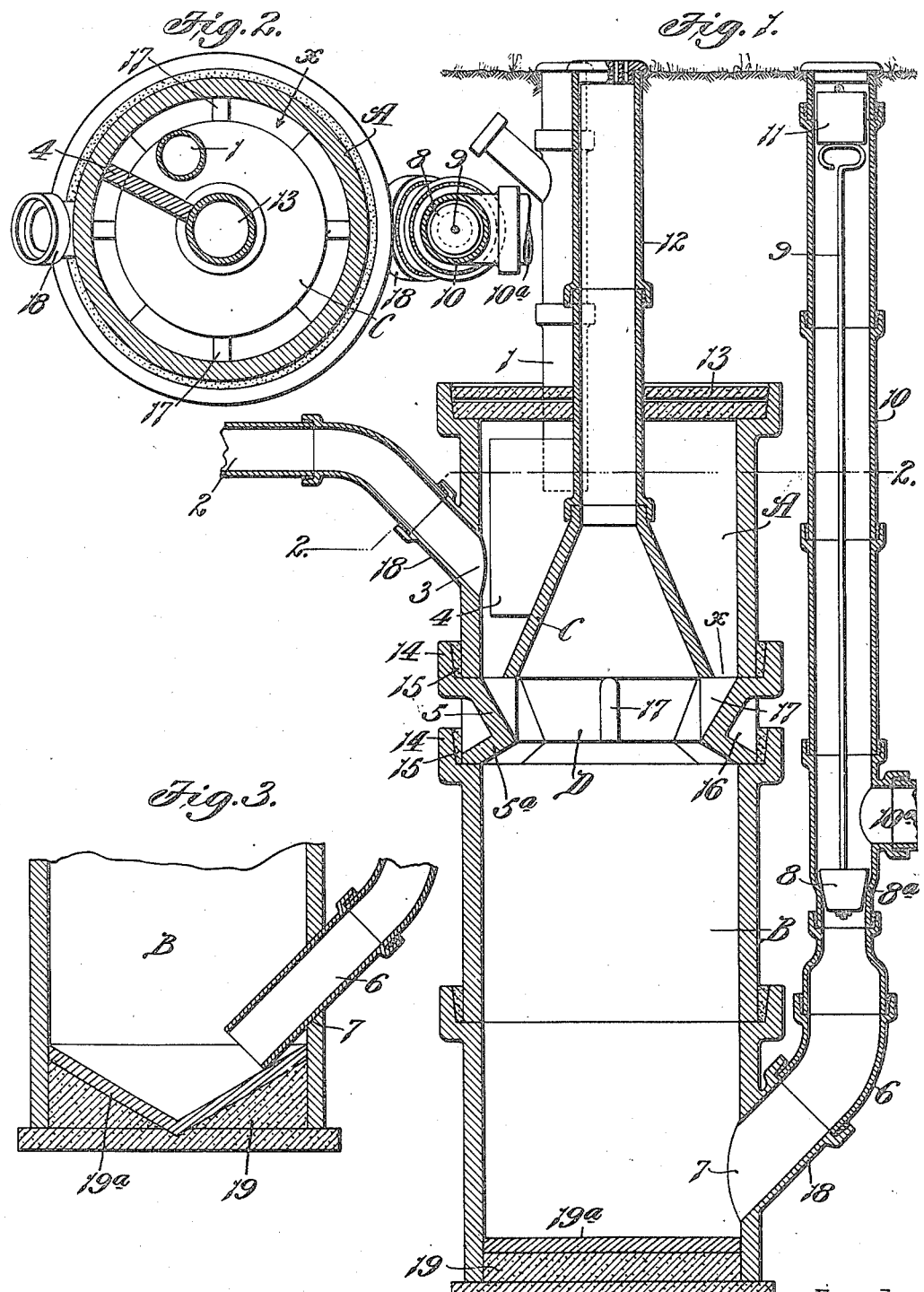

WILLIAM C. FERGUSON, OF ST. LOUIS, MISSOURI.

SEPTIC TANK.

1,224,913.  Specification of Letters Patent.  Patented May 8, 1917.

Application filed November 16, 1916. Serial No. 131,703.

*To all whom it may concern:*

Be it known that I, WILLIAM C. FERGUSON, a citizen of the United States, residing at St. Louis, Missouri, have invented a certain new and useful Improvement in Septic Tanks, of which the following is a full, clear, and exact description, such as will enable others skilled in the art to which it appertains to make and use the same.

This invention relates to septic tanks of the type in which a settling chamber is arranged above a digesting chamber in such a manner that the heavier solid particles in the sewage that is admitted to the settling chamber will settle out of the liquid and collect in the digesting chamber, wherein the process of digestion and fermentation takes place.

The main object of my invention is to provide an efficient septic tank of simple construction that is particularly adapted for use with small buildings and which can be manufactured at a low cost and installed easily. To this end I have devised a septic tank which is composed of a number of separate units or sections, preferably formed of vitrified tile; that can be molded easily at a factory, shipped to the place where the tank is to be installed and there erected by unskilled labor, so as to form a complete septic tank.

Figure 1 of the drawings is a vertical sectional view of a septic tank constructed in accordance with my invention.

Fig. 2 is a horizontal sectional view, taken on the line 2—2 of Fig. 1; and

Fig. 3 is a detail vertical sectional view, illustrating a slight modification of my invention.

Referring to Fig. 1 of the drawings which illustrate one form of my invention, A designates the settling chamber of the tank, B designates the digesting chamber and C designates a cone-shaped member that is arranged inside of the settling chamber. The sewage is supplied to the settling chamber by means of an inlet pipe 1 that enters the side of said chamber at a point adjacent the upper end of same, and the effluent escapes from the settling chamber through an effluent pipe 2 that communicates with an outlet 3 formed in the side of the settling chamber at a point below the inlet, the settling chamber being provided with a vertically-disposed baffle 4 that is arranged between the inlet and outlet of said chamber in engagement with the exterior of the cone-shaped partition member C and the side wall of said chamber, so as to cause the sewage that is admitted to the chamber A to follow a circular path in circulating through said chamber. The lower edge of the cone-shaped member C is spaced away slightly from the side wall of the settling chamber A, so as to form an annular slot $x$ through which the heavier particles that settle out of the sewage can pass into the digesting chamber B, and a throat member D is arranged between the chambers A and B, as shown in Fig. 1, so as to support the partition member C and form a throat or entrance opening for the digesting chamber, which is of less diameter than the annular passageway $x$ through which the solid particles of the sewage escape from the settling chamber, said throat member having an annular wall 5 that slopes downwardly and inwardly from the lower edge of the side wall of the settling chamber. The sludge produced by the decomposition of the solid particles of the sewage is conducted out of the digesting chamber B through a pipe 6 that communicates with a sludge discharge opening 7 formed in the side of the digesting chamber adjacent the lower end of same. The pipe 6 is normally closed by a valve 8 which can be opened when it is desired to discharge the sludge from the digesting chamber, and while it is immaterial what type of valve is employed for controlling the discharge of sludge from the digesting chamber, I prefer to use a stopper valve that is equipped with a rod or other suitable actuating device 9 which leads to the surface of the ground, so as to enable the valve 8 to be opened and closed easily. The valve-operating rod 9 is incased in a pipe 10 whose upper end terminates at or in proximity to the surface of the ground, and a weight 11 or other suitable means is used for exerting downward pressure on the valve-operating member 9, so as to hold the valve 8 closed. At a point above the valve 8 the pipe 10 is provided with a branch 10ª, through which the sludge is conducted to a point some distance away from the tank. The effluent pipe 2 can be provided with a branch (not shown) that leads to the surface of the ground, and the settling chamber A can either be buried completely under the ground, or the upper edge of same can terminate at the surface of the ground. In the form of my invention herein shown the settling tank A is buried some distance beneath the surface of the ground, and a vent pipe 12 is provided for the gases that are evolved in the digesting chamber, said vent pipe 12 leading upwardly from the cone-shaped partition member C through the cover or top wall 13 of the settling chamber and terminating at the surface of the ground. The settling chamber, the digesting chamber and the various pipes previously referred to are preferably formed from hollow vitrified tile, and the partition member C, the throat member D and also the baffle 4 are also formed from similar material, thereby enabling the various sections or units that constitute the tank to be molded at the factory and shipped in knock-down form to the place where the tank is to be installed. The settling chamber A can either be formed from one tile, as shown in Fig. 1, or a plurality of tiles, arranged one above the other, can be used to form the settling chamber, and the digesting chamber B can be formed either from one or from a plurality of tiles. While I prefer to form said chambers from complete cylindrical tiles, it will, of course, be understood that said chambers could be built up of a plurality of segmental-shaped sections, in case it was desired to form a tank having a settling chamber and digesting chamber of comparatively great diameter. The tiles that I prefer to use, however, are similar to the large-sized vitrified tiles used in sewer construction, each of which consists of a substantially tubular-shaped member provided at one end with an integral collar or rim 14 that serves as a container or holder for cement 15 or some other suitable material used to connect the tiles together and form tight joints between them.

The throat member D that is arranged between the settling chamber and the digesting chamber is preferably composed of a number of segments, which, when assembled, form an annular or ring-shaped member, but I wish it to be understood that it is immaterial, so far as my broad idea is concerned, whether said throat member is formed in one piece or built up of a number of segments. The throat member D rests upon the upper end of the tile that forms the upper portion of the digesting chamber, and said throat member is also provided with a collar or rim that surrounds the lower end of the tile that forms the settling chamber. The base of the throat member D is formed by a wall or portion $5^a$ that is inclined oppositely to the downwardly-inclined wall 5 of said throat member, and if desired, said oppositely-inclined walls 5 and $5^a$ can be reinforced and strengthened by a plurality of vertically-disposed ribs 16 on the outer side of said member that are integrally connected to the portions 5 and $5^a$ thereof. The member D, in addition to forming a throat for the digesting chamber, also serves as a support for the cone-shaped member C that is arranged inside of the settling chamber. In the form of my invention herein shown the partition member C rests upon lugs or webs 17 on the inner side of the throat member D, but the particular construction of the throat member D is immaterial, so far as my broad idea is concerned, so long as it is constructed in such a manner that it serves as a support for the partition member C and still permits the heavier particles of the sewage to pass from the settling chamber into the digesting chamber.

The effluent pipe, the vent pipe, the sludge discharge pipe and the pipe that incases the valve-actuating device are preferably formed from short sections of vitrified sewer pipe, and the seat $8^a$ for the stopper valve is formed by a reduced portion on one section of the pipe in which said valve is arranged. The effluent pipe and the sludge discharge pipe can either be inserted in flanged tubular portions 18 integrally connected to the settling chamber and the digesting chamber, as shown in Fig. 1, or said pipes can be inserted through the effluent discharge opening 3 in the settling chamber and the sludge discharge opening 7 in the digesting chamber, respectively, in the manner shown in Fig. 3. The bottom 19 of the digesting chamber is preferably formed from concrete provided with a top facing $19^a$ of vitrified clay, and said bottom may either be flat, as shown in Fig. 1, or provided with inclined or angularly-disposed surfaces, as shown in Fig. 3. While I have stated that the tank is preferably made up of vitrified tiling, I wish it to be understood that it is immaterial, so far as my broad idea is concerned, what particular kind of material the various sections or parts of the tank are made of, as my broad idea consists in a septic tank of the general character previously referred to, which is composed of a number of separate sections or parts that are completely formed or in the shape of individual units that can be combined easily, so as to produce a complete septic tank. Another desirable feature of my improved tank which adds greatly to its commercial value, is that the cone-shaped member arranged inside of the settling chamber is supported directly by the throat member D, thus overcoming the necessity of building a supporting structure inside of the settling chamber to carry the partition member C. My improved tank can be built in large and small sizes, but its chief use will probably be for comparatively small buildings, on account of its low cost of manufacture and installation when it is constructed of standard size vitrified tile and sewer pipe sections.

Having thus described my invention, what I claim, and desire to secure by Letters Patent, is:

1. A septic tank, comprising a digesting chamber, a settling chamber arranged above same, a partition member arranged inside of said settling chamber, and a throat piece for said digesting chamber that supports said partition member.

2. A septic tank, comprising a digesting chamber, a settling chamber arranged above same, a partition member inside of said settling chamber whose lower edge portion is spaced away from the side wall of said settling chamber so as to form a narrow discharge passageway for the solid particles of the sewage that settle out of the liquid, and a throat member that forms a contracted receiving opening for the digesting chamber and also acts as a support for said partition member.

3. A septic tank, comprising a digesting chamber, a settling chamber arranged above same, a cone-shaped partition member arranged inside of said settling chamber, and a supporting means for said partition member that forms a throat or contracted receiving opening for said digesting chamber.

4. A septic tank, comprising a digesting chamber, a throat member arranged at the upper end of said chamber, and a settling chamber carried by said throat member and provided with a cone-shaped partition member that is also supported by said throat member.

5. A septic tank, comprising a digesting chamber, a settling chamber arranged above same, a partition member arranged inside of said settling chamber whose lower edge portion is spaced away from the side wall of same so as to form a passageway through which the solid particles of the sewage that settle out of the liquid can escape from said chamber, and a supporting means for said partition member provided with a wall that slopes inwardly and downwardly from the opening through which the solid particles escape from said settling chamber.

6. A septic tank, comprising a digesting chamber, a settling chamber arranged above same, a partition member arranged inside of said settling chamber whose lower edge portion is spaced away from the side wall of same so as to form a passageway through which the solid particles of the sewage that settle out of the liquid can escape from said chamber, and a supporting means for said partition member provided with a wall that slopes inwardly and downwardly from the opening through which the solid particles escape from said settling chamber, said supporting means consisting of a substantially ring-shaped element provided with devices on which the lower edge of said partition member rests.

7. A septic tank, comprising a settling chamber provided with means whereby the solid particles of the sewage that passes through said chamber can settle out of the liquid and escape from said chamber, a digesting chamber that receives said solid particles, and a member interposed between said chambers that forms a contracted throat for the digesting chamber, said element being composed of parts that are first molded or completely formed and thereafter combined at the place where the tank is installed.

8. A septic tank, comprising a settling chamber and a digesting chamber formed as separate and distinct structures from sections of vitrified tiling, a cone-shaped partition member arranged inside of said settling chamber, and a sectional member arranged between said chambers and being of such shape that it forms a contracted throat for said digesting chamber and also serves as a support for said partition member.

9. A septic tank composed of a number of tubular-shaped members arranged one above the other so as to form a digesting chamber and a settling chamber, a throat member arranged between the upper edge of said digesting chamber and the lower edge of said settling chamber, and a cone-shaped partition member in said settling chamber that is supported by said throat member.

10. A septic tank, comprising a digesting chamber, a throat member mounted on the upper end of said digesting chamber and having oppositely-inclined walls, a settling chamber mounted on said throat member, a partition member arranged inside of said settling chamber, and lugs on said throat member that support said partition member.

11. A septic tank, comprising a settling chamber provided with an inlet and an outlet, a cone-shaped partition member arranged inside of said settling chamber, a baffle arranged between said partition member and the side wall of said settling chamber at a point between said inlet and outlet, a digesting chamber arranged underneath said settling chamber and provided at its lower end with a discharge opening for the sludge, and a member arranged between said chambers that forms a contracted throat for the digesting chamber and also supports said partition member in operative position.

WILLIAM C. FERGUSON.